(12) United States Patent
Slipenchuk

(10) Patent No.: US 10,958,684 B2
(45) Date of Patent: Mar. 23, 2021

(54) METHOD AND COMPUTER DEVICE FOR IDENTIFYING MALICIOUS WEB RESOURCES

(71) Applicant: GROUP IB, LTD, Moscow (RU)

(72) Inventor: Pavel Vladimirovich Slipenchuk, Moscow (RU)

(73) Assignee: GROUP IB, LTD, Moscow (RU)

( * ) Notice: Subject to any disclaimer, the term of this patent is extended or adjusted under 35 U.S.C. 154(b) by 327 days.

(21) Appl. No.: 16/239,605

(22) Filed: Jan. 4, 2019

(65) Prior Publication Data
US 2019/0222609 A1 Jul. 18, 2019

(30) Foreign Application Priority Data

Jan. 17, 2018 (RU) .......................... RU2018101760

(51) Int. Cl.
*G08B 23/00* (2006.01)
*G06F 12/16* (2006.01)
(Continued)

(52) U.S. Cl.
CPC .... *H04L 63/1483* (2013.01); *G06F 16/24578* (2019.01); *G06F 16/9566* (2019.01);
(Continued)

(58) Field of Classification Search
CPC ............. H04L 63/1483; H04L 63/1416; H04L 63/168; G06F 16/9566; G06F 16/24578; G06N 20/00
(Continued)

(56) References Cited

U.S. PATENT DOCUMENTS 7,225,343 B1 5/2007 Honig et al.
7,496,628 B2 2/2009 Arnold et al.
(Continued)

FOREIGN PATENT DOCUMENTS

CN 103491205 A 1/2014
CN 104504307 A 4/2015
(Continued)

OTHER PUBLICATIONS

English Abstract of RU107616 retrieved on Espacenet on Jul. 3, 2017.
(Continued)

*Primary Examiner* — Monjur Rahim
(74) *Attorney, Agent, or Firm* — BCF LLP

(57) ABSTRACT

The disclosed non-limiting embodiments of the present technology are directed to methods and systems for warning in regard to cyber threats, especially methods to detect malicious web resources, in particular phishing websites, and mirrors of blocked and/or prohibited websites. The disclosed method comprises receiving, by the computer device, pointers for a plurality of web resources; extracting, by the computer device, at least some of the content elements of each web resource of the plurality of web resources. Iteratively combining, by the computer device, at least two content elements into subgroups and then iteratively combining subgroups into groups in response to a number of web resources including the at least two content elements exceeding a predefined minimum threshold of web resources for the at least one first subgroup and/or group.

19 Claims, 7 Drawing Sheets

(51) Int. Cl.
*G06F 12/14* (2006.01)
*G06F 11/00* (2006.01)
*H04L 29/06* (2006.01)
*G06N 20/00* (2019.01)
*G06F 16/2457* (2019.01)
*G06F 16/955* (2019.01)

(52) U.S. Cl.
CPC ......... *G06N 20/00* (2019.01); *H04L 63/1416* (2013.01); *H04L 63/1425* (2013.01); *H04L 63/168* (2013.01)

(58) Field of Classification Search
USPC .......................................................... 726/23
See application file for complete search history.

(56) References Cited

U.S. PATENT DOCUMENTS

| | | | |
|---|---|---|---|
| 7,712,136 | B2 | 5/2010 | Sprosts et al. |
| 7,730,040 | B2 | 6/2010 | Reasor et al. |
| 7,865,953 | B1 | 1/2011 | Hsieh et al. |
| 7,926,113 | B1 | 4/2011 | Gula et al. |
| 7,958,555 | B1 | 6/2011 | Chen et al. |
| 7,984,500 | B1 | 7/2011 | Khanna et al. |
| 8,132,250 | B2 | 3/2012 | Judge et al. |
| 8,151,341 | B1 | 4/2012 | Gudov |
| 8,255,532 | B2 | 8/2012 | Smith-Mickelson et al. |
| 8,260,914 | B1 | 9/2012 | Ranjan |
| 8,285,830 | B1 | 10/2012 | Stout et al. |
| 8,402,543 | B1 | 3/2013 | Ranjan et al. |
| 8,448,245 | B2 | 5/2013 | Banerjee et al. |
| 8,532,382 | B1 | 9/2013 | Ioffe |
| 8,539,582 | B1 | 9/2013 | Aziz et al. |
| 8,555,388 | B1 | 10/2013 | Wang et al. |
| 8,561,177 | B1 | 10/2013 | Aziz et al. |
| 8,600,993 | B1 | 12/2013 | Gupta et al. |
| 8,612,463 | B2 | 12/2013 | Brdiczka et al. |
| 8,625,033 | B1 | 1/2014 | Marwood et al. |
| 8,635,696 | B1 | 1/2014 | Aziz |
| 8,650,080 | B2 | 2/2014 | O'Connell et al. |
| 8,660,296 | B1 | 2/2014 | Ioffe |
| 8,677,472 | B1 | 3/2014 | Dotan et al. |
| 8,776,229 | B1 | 7/2014 | Aziz |
| 8,839,441 | B2 | 9/2014 | Saxena et al. |
| 8,850,571 | B2 | 9/2014 | Staniford et al. |
| 8,856,937 | B1 * | 10/2014 | Wuest ................ H04L 63/1483 726/26 |
| 8,972,412 | B1 | 3/2015 | Christian et al. |
| 8,984,640 | B1 * | 3/2015 | Emigh ................ H04L 63/1441 726/25 |
| 9,026,840 | B1 | 5/2015 | Kim |
| 9,060,018 | B1 | 6/2015 | Yu et al. |
| 9,210,111 | B2 | 12/2015 | Chasin et al. |
| 9,215,239 | B1 | 12/2015 | Wang et al. |
| 9,253,208 | B1 | 2/2016 | Koshelev |
| 9,292,691 | B1 * | 3/2016 | Hittel ................ G06F 21/563 |
| 9,330,258 | B1 | 5/2016 | Satish et al. |
| 9,338,181 | B1 | 5/2016 | Burns et al. |
| 9,357,469 | B2 | 5/2016 | Smith et al. |
| 9,456,000 | B1 | 9/2016 | Spiro et al. |
| 9,654,593 | B2 | 5/2017 | Garg et al. |
| 9,723,344 | B1 | 8/2017 | Granström et al. |
| 9,736,178 | B1 | 8/2017 | Ashley |
| 9,917,852 | B1 | 3/2018 | Xu et al. |
| 9,934,376 | B1 | 4/2018 | Ismael |
| 10,110,601 | B1 * | 10/2018 | Jakobsson ........... H04L 63/1483 |
| 10,212,175 | B2 * | 2/2019 | Seul ................ H04L 63/1491 |
| 10,440,050 | B1 * | 10/2019 | Neel ................ G06F 21/554 |
| 2002/0161862 | A1 | 10/2002 | Horvitz |
| 2003/0009696 | A1 | 1/2003 | Bunker et al. |
| 2003/0028803 | A1 | 2/2003 | Bunker et al. |
| 2004/0193918 | A1 | 9/2004 | Green et al. |
| 2006/0074858 | A1 | 4/2006 | Etzold et al. |
| 2006/0107321 | A1 | 5/2006 | Tzadikario |
| 2006/0224898 | A1 | 10/2006 | Ahmed |
| 2006/0253582 | A1 | 11/2006 | Dixon et al. |
| 2007/0019543 | A1 | 1/2007 | Wei et al. |
| 2007/0239999 | A1 | 10/2007 | Honig et al. |
| 2008/0295173 | A1 | 11/2008 | Tsvetanov |
| 2009/0077383 | A1 * | 3/2009 | de Monseignat ... H04L 63/0823 713/175 |
| 2009/0138342 | A1 | 5/2009 | Otto et al. |
| 2009/0281852 | A1 | 11/2009 | Abhari et al. |
| 2009/0292925 | A1 | 11/2009 | Meisel |
| 2010/0011124 | A1 | 1/2010 | Wei et al. |
| 2010/0037314 | A1 | 2/2010 | Perdisci et al. |
| 2010/0076857 | A1 | 3/2010 | Deo et al. |
| 2010/0115620 | A1 | 5/2010 | Alme |
| 2010/0115621 | A1 | 5/2010 | Staniford et al. |
| 2010/0191737 | A1 | 7/2010 | Friedman et al. |
| 2010/0205665 | A1 | 8/2010 | Komili et al. |
| 2010/0228731 | A1 | 9/2010 | Gollapudi |
| 2010/0235918 | A1 | 9/2010 | Mizrahi et al. |
| 2011/0016533 | A1 * | 1/2011 | Zeigler ................ G06F 21/552 726/26 |
| 2011/0222787 | A1 | 9/2011 | Thiemert et al. |
| 2012/0030293 | A1 | 2/2012 | Bobotek |
| 2012/0079596 | A1 | 3/2012 | Thomas et al. |
| 2012/0087583 | A1 | 4/2012 | Yang et al. |
| 2012/0158626 | A1 | 6/2012 | Zhu et al. |
| 2012/0233656 | A1 | 9/2012 | Rieschick et al. |
| 2012/0291125 | A1 | 11/2012 | Maria |
| 2013/0086677 | A1 | 4/2013 | Ma et al. |
| 2013/0103666 | A1 | 4/2013 | Sandberg et al. |
| 2013/0111591 | A1 | 5/2013 | Topan et al. |
| 2013/0117848 | A1 | 5/2013 | Golshan et al. |
| 2013/0191364 | A1 | 7/2013 | Kamel et al. |
| 2013/0263264 | A1 | 10/2013 | Klein et al. |
| 2013/0297619 | A1 | 11/2013 | Chandrasekaran et al. |
| 2013/0340080 | A1 | 12/2013 | Gostev et al. |
| 2014/0033307 | A1 | 1/2014 | Schmidtler |
| 2014/0058854 | A1 | 2/2014 | Ranganath et al. |
| 2014/0082730 | A1 | 3/2014 | Vashist et al. |
| 2014/0173287 | A1 | 6/2014 | Mizunuma |
| 2014/0250145 | A1 | 9/2014 | Jones et al. |
| 2014/0310811 | A1 * | 10/2014 | Hentunen ............ H04L 61/305 726/23 |
| 2014/0317754 | A1 * | 10/2014 | Niemela ............ G06F 21/552 726/26 |
| 2014/0380480 | A1 * | 12/2014 | Tang ................ H04L 63/1408 726/24 |
| 2015/0007250 | A1 | 1/2015 | Dicato, Jr. et al. |
| 2015/0049547 | A1 | 2/2015 | Kim |
| 2015/0067839 | A1 | 3/2015 | Wardman et al. |
| 2015/0163242 | A1 | 6/2015 | Laidlaw et al. |
| 2015/0170312 | A1 | 6/2015 | Mehta et al. |
| 2015/0200962 | A1 * | 7/2015 | Xu ........................ G06F 21/566 726/23 |
| 2015/0200963 | A1 | 7/2015 | Geng et al. |
| 2015/0220735 | A1 | 8/2015 | Paithane et al. |
| 2015/0295945 | A1 | 10/2015 | Canzanese et al. |
| 2015/0363791 | A1 | 12/2015 | Raz et al. |
| 2015/0381654 | A1 * | 12/2015 | Wang ...................... H04L 67/22 726/23 |
| 2016/0036837 | A1 | 2/2016 | Jain et al. |
| 2016/0036838 | A1 * | 2/2016 | Jain ..................... H04L 63/1416 726/23 |
| 2016/0044054 | A1 | 2/2016 | Stiansen et al. |
| 2016/0055490 | A1 | 2/2016 | Keren et al. |
| 2016/0065595 | A1 | 3/2016 | Kim et al. |
| 2016/0080410 | A1 | 3/2016 | Gorny et al. |
| 2016/0112445 | A1 * | 4/2016 | Abramowitz ....... H04L 63/1425 726/23 |
| 2016/0127907 | A1 | 5/2016 | Baxley et al. |
| 2016/0142429 | A1 * | 5/2016 | Renteria ............ H04L 63/1416 726/23 |
| 2016/0149943 | A1 | 5/2016 | Kaloroumakis et al. |
| 2016/0191243 | A1 | 6/2016 | Manning |
| 2016/0205122 | A1 * | 7/2016 | Bassett ................ G06F 21/577 726/23 |
| 2016/0205123 | A1 | 7/2016 | Almurayh et al. |
| 2016/0226894 | A1 | 8/2016 | Lee et al. |

(56) References Cited

U.S. PATENT DOCUMENTS

| | | |
|---|---|---|
| 2016/0253679 A1 | 9/2016 | Venkatraman et al. |
| 2016/0261628 A1 | 9/2016 | Doron et al. |
| 2016/0267179 A1 | 9/2016 | Mei et al. |
| 2016/0285907 A1 | 9/2016 | Nguyen et al. |
| 2016/0306974 A1 | 10/2016 | Turgeman et al. |
| 2016/0359679 A1 | 12/2016 | Parandehgheibi et al. |
| 2017/0034211 A1 | 2/2017 | Buergi et al. |
| 2017/0078321 A1* | 3/2017 | Maylor ............... H04L 51/12 |
| 2017/0111377 A1 | 4/2017 | Park et al. |
| 2017/0134401 A1 | 5/2017 | Medvedovsky et al. |
| 2017/0142144 A1 | 5/2017 | Weinberger et al. |
| 2017/0149813 A1 | 5/2017 | Wright et al. |
| 2017/0200457 A1 | 7/2017 | Chai et al. |
| 2017/0230401 A1 | 8/2017 | Ahmed et al. |
| 2017/0244735 A1 | 8/2017 | Visbal et al. |
| 2017/0250972 A1 | 8/2017 | Ronda et al. |
| 2017/0272471 A1 | 9/2017 | Veeramachaneni et al. |
| 2017/0279818 A1 | 9/2017 | Milazzo et al. |
| 2017/0286544 A1 | 10/2017 | Hunt et al. |
| 2017/0289187 A1 | 10/2017 | Noel et al. |
| 2017/0295157 A1 | 10/2017 | Chavez et al. |
| 2017/0295187 A1 | 10/2017 | Havelka et al. |
| 2017/0324738 A1 | 11/2017 | Hari et al. |
| 2017/0346839 A1 | 11/2017 | Peppe et al. |
| 2018/0012021 A1 | 1/2018 | Volkov |
| 2018/0012144 A1 | 1/2018 | Ding et al. |
| 2018/0034779 A1 | 2/2018 | Ahuja et al. |
| 2018/0063190 A1 | 3/2018 | Wright et al. |
| 2018/0096153 A1 | 4/2018 | Dewitte et al. |
| 2018/0115573 A1 | 4/2018 | Kuo et al. |
| 2018/0152471 A1* | 5/2018 | Jakobsson ........... H04L 63/1433 |
| 2018/0268464 A1 | 9/2018 | Li |
| 2018/0307832 A1 | 10/2018 | Ijiro et al. |
| 2018/0309787 A1 | 10/2018 | Evron et al. |
| 2019/0089737 A1 | 3/2019 | Shayevitz et al. |
| 2019/0207973 A1 | 7/2019 | Peng |
| 2019/0373005 A1 | 12/2019 | Bassett |
| 2020/0134702 A1 | 4/2020 | Li |

FOREIGN PATENT DOCUMENTS

| | | |
|---|---|---|
| CN | 105429955 A | 3/2016 |
| CN | 105429956 A | 3/2016 |
| CN | 105897714 A | 8/2016 |
| CN | 106131016 A | 11/2016 |
| CN | 106506435 A | 3/2017 |
| CN | 106713312 A | 5/2017 |
| CN | 107392456 A | 11/2017 |
| EP | 1160646 A2 | 12/2001 |
| EP | 2410452 B1 | 1/2016 |
| GB | 2493514 A | 2/2013 |
| KR | 10-2007-0049514 A | 5/2007 |
| KR | 10-1514984 B1 | 4/2015 |
| RU | 2382400 C2 | 2/2010 |
| RU | 107616 U1 | 8/2011 |
| RU | 2446459 C1 | 3/2012 |
| RU | 129279 U1 | 6/2013 |
| RU | 2487406 C1 | 7/2013 |
| RU | 2488880 C1 | 7/2013 |
| RU | 2495486 C1 | 10/2013 |
| RU | 2522019 C1 | 7/2014 |
| RU | 2523114 C2 | 7/2014 |
| RU | 2530210 C2 | 10/2014 |
| RU | 2536664 C2 | 12/2014 |
| RU | 2538292 C1 | 1/2015 |
| RU | 2543564 C1 | 3/2015 |
| RU | 2566329 C2 | 10/2015 |
| RU | 2571594 C2 | 12/2015 |
| RU | 2589310 C2 | 7/2016 |
| RU | 164629 U1 | 9/2016 |
| RU | 2607231 C2 | 1/2017 |
| RU | 2610586 C2 | 2/2017 |
| RU | 2613535 C1 | 3/2017 |
| RU | 2622870 C2 | 6/2017 |
| RU | 2625050 C1 | 7/2017 |
| RU | 2628192 C2 | 8/2017 |
| RU | 2636702 C1 | 11/2017 |
| RU | 2670906 C9 | 12/2018 |
| RU | 2681699 C1 | 3/2019 |
| WO | 0245380 A2 | 6/2002 |
| WO | 2009/026564 A1 | 2/2009 |
| WO | 2011/045424 A1 | 4/2011 |
| WO | 2012/015171 A2 | 2/2012 |
| WO | 2019/010182 A1 | 1/2019 |
| WO | 2019/153384 A1 | 8/2019 |

OTHER PUBLICATIONS

European Search Report with regard to EP17180099 completed on Nov. 28, 2017.
European Search Report with regard to EP17191900 completed on Jan. 11, 2018.
Yoshioka et al., "Sandbox Analysis with Controlled Internet Connection for Observing Temporal Changes of Malware Behavior", https://www.researchgate.net/publication/254198606, 15 pages.
Yoshioka et al., "Multi-Pass Malware Sandbox Analysis with Controlled Internet Connection", IEICE Transactions on Fundamentals of Electronics, Communications and Computer Sciences, Engineering Sciences Society, Tokyo, 2010, vol. E93A, No. 1, p. p. 210-218.
Wikipedia, "Blockchain", https://en.wikipedia.org/wiki/Blockchain, pdf document, 18 pages.
Search Report with regard to the counterpart RU Patent Application No. 2018101764 completed Jun. 29, 2018.
Search Report with regard to the counterpart RU Patent Application No. 2018101761 completed Jun. 20, 2018.
International Search Report with regard to the counterpart Patent Application No. PCT/RU2016/000526 dated Jun. 1, 2017.
European Search Report with regard to the counterpart EP Patent Application No. EP17210904 completed May 16, 2018.
Search Report with regard to the counterpart RU Patent Application No. 2018101759 completed Sep. 7, 2018.
English Abstract of RU129279 retrieved on Espacenet on Sep. 11, 2017.
English Abstract of RU164629 retrieved on Espacenet on Sep. 11, 2017.
English Abstract of RU2538292 retrieved on Espacenet on Sep. 11, 2017.
Prakash et al., "PhishNet: Predictive Blacklisting to Detect Phishing Attacks", INFOCOM, 2010 Proceedings IEEE, USA, 2010, ISBN: 978-1-4244-5836-3, doc. 22 pages.
Search Report with regard to the counterpart Patent Application No. RU2018105377 completed Oct. 15, 2018.
Search Report with regard to the counterpart RU Patent Application No. 2018101763 completed Jan. 11, 2019.
Search Report with regard to the counterpart RU Patent Application No. 2016137336 completed Jun. 6, 2017.
English Abstract of RU2522019 retrieved on Espacenet on Jan. 25, 2019.
Search Report with regard to the counterpart RU Patent Application No. 2017140501 completed Jul. 11, 2018.
European Search Report with regard to the counterpart EP Patent Application No. EP17211131 completed Apr. 12, 2018.
English Abstract for CN105429955 retrieved on Espacenet on Jul. 13, 2020.
Office Action with regard to the counterpart U.S. Appl. No. 15/858,013 dated Nov. 22, 2019.
Search Report with regard to the counterpart RU Patent Application No. 2018144708 completed Aug. 16, 2019.
Search Report with regard to the counterpart RU Patent Application No. 2018147431 completed Aug. 15, 2019.
English Translation of KR10-2007-0049514 (Description, Claims) retrieved on Espacenet on Oct. 15, 2019.
English Abstract of KR10-1514984 retrieved on Espacenet on Oct. 15, 2019.
Office Action received with regard to the counterpart U.S. Appl. No. 15/858,032 dated Apr. 6, 2020.
Office Action with regard to the counterpart U.S. Appl. No. 16/261,854 dated Oct. 21, 2019.

(56) References Cited

OTHER PUBLICATIONS

Office Action with regard to the counterpart U.S. Appl. No. 16/270,341 dated Dec. 4, 2020.
Search Report with regard to the counterpart RU Patent Application No. 2018101760 completed Jun. 22, 2018.
Office Action with regard to the counterpart U.S. Appl. No. 16/270,341 dated May 27, 2020.
Search Report with regard to the counterpart SG Patent Application No. 10201900062S dated Dec. 5, 2019.
Search Report with regard to the counterpart SG Patent Application No. 10201900060Y dated Dec. 5, 2019.
English Abstract for CN105429956 retrieved on Espacenet on Jan. 7, 2020.
English Abstract for CN104504307 retrieved on Espacenet on Jan. 7, 2020.
Notice of Allowance with regard to the counterpart U.S. Appl. No. 15/858,013 dated May 8, 2020.
Office Action with regard to the counterpart U.S. Appl. No. 15/707,641 dated Apr. 25, 2019.
Notice of Allowance with regard to the counterpart U.S. Appl. No. 15/858,013 dated Jun. 10, 2020.
Search Report with regard to the RU Patent Application No. 2019142440 completed Oct. 26, 2020.
Notice of Allowance with regard to the counterpart U.S. Appl. No. 15/707,641 dated Oct. 30, 2019.
Whyte, "DNS-based Detection of Scanning Worms in an Enterprise Network", Aug. 2004, NOSS, pp. 1-17 (Year: 2005)—in the Notice of Allowance with regard to the counterpart U.S. Appl. No. 15/707,641.
English Translation of CN106713312, © Questel—FAMPAT, Jul. 17, 2019.
English Translation of CN105897714, © Questel—FAMPAT, Jul. 17, 2019.
English Translation of CN106506435, © Questel—FAMPAT, Jul. 26, 2019.
English Translation of CN107392456, © Questel—FAMPAT, Jul. 29, 2019.
English Translation of CN103491205, © Questel—FAMPAT, Jul. 29, 2019.
English Translation of CN106131016, © Questel—FAMPAT, Jul. 17, 2019.
Invitation to Respond to Written Opinion received Aug. 5, 2019 with regard to the counterpart SG Patent Application No. 10201900339Q.
Invitation to Respond to Written Opinion received Aug. 5, 2019 with regard to the counterpart SG Patent Application No. 10201901079U.
Invitation to Respond to Written Opinion received Jul. 31, 2019 with regard to the counterpart SG Patent Application No. 10201900335P.

\* cited by examiner

METHOD AND COMPUTER DEVICE FOR IDENTIFYING MALICIOUS WEB RESOURCES

CROSS-REFERENCE

The present application claims convention priority to Russian Utility Patent Application No. 2018101760, filed on Jan. 17, 2018, entitled "METHOD AND COMPUTER DEVICE FOR IDENTIFYING MALICIOUS WEB RESOURCES", the entirety of which is incorporated herein by reference.

TECHNICAL FIELD

This technology relates to methods and systems for early warning about cyber threats in general, and more specifically to methods to detect malicious web resources, in particular phishing websites, and mirrors of blocked and/or prohibited web sites.

BACKGROUND

Phishing is widespread among malicious web resources. It allows obtaining confidential user data in order to commit fraudulent actions.

Generally speaking, the phishing sites work as follows. A typical phishing site executes copying or imitating sites for various services, for example, banks, payment systems, online auctions, email services, and social networks in order to obtain confidential data from users voluntarily (account name, password, email, full name, passport number, credit card data, etc.). A user who is transferred to a phishing site, for example, a fake online banking service, is prompted to enter registration data and/or provide additional confidential information using various psychological techniques. For example, the user can be prompted to enter their account name and password for their online banking account, and to inform of the approximate balance in the account. This may enable the individuals with malicious intent to access the bank account (using the so-misappropriated account access data) and to steal the user's funds or take other illegal actions with the use of the obtained information.

Furthermore, it is possible to copy or imitate web resources for purposes of mischief, profiting of displaying advertisements, displaying inaccurate or prohibited information, etc., which may cause reputational harm to the owners of the original web resources that were copied or imitated. In the case of creating mirrors of prohibited or blocked web resources, users may be provided access to such resources, which may cause harm to third parties. For example, the owners of intellectual property may be harmed by the provision of access to mirror sites that distribute pirated content that was previously blocked.

Phishing sites are widespread in the area of online payment systems and banking services. Access to the targeted resources may be obtained through the devices of company employees, partners, and clients. The creators of phishing websites use various means to redirect user traffic to fraudulent pages: distributing spam, capturing traffic by interacting with the DNS server, typosquatting, etc.

According to the study entitled "Wombat Security State of the Phish 2017", in 2016 76% of organizations had been victims of a phishing attack. The total number of known phishing attacks in 2017 was over 1 million. In recent years, phishing technologies have been actively developed, the complexity of algorithms has increased, and the masking of phishing web pages has improved. It has become more difficult to identify phishing web pages, even for experienced users and the owners of web resources themselves. Modern internet security systems can identify phishing web resources, block them, and/or warn users when they are visiting suspicious web resources to caution them against entering confidential data.

Phishing distribution technologies facilitate the creation of many similar site using so-called phishing packs (Phishing pack, Phishing Toolkit), which makes it more difficult to timely detect and block them. A phishing kit is a program that simplifies the creation of phishing sites; it contains the basic templates and scripts that are necessary to create and configure multiple phishing sites and to collect user data. By adding content from the original site, or content similar thereto, scammers can quickly create many similar phishing sites, which makes it more difficult to timely detect and block them. Due to the large number of phishing websites and their similarity to original web resources, it has become time-consuming and laborious for IT security specialists to check suspicious web resources manually. Creating automated systems and methods that accelerate the process of identifying and blocking phishing web resources is an important task.

In the simplest case, phishing web resources are identified by comparing the URL address with a database of URL addresses. Methods that are more complicated may be based on analyzing the page content.

US Patent Application No. 20120158626 (published Jun. 21, 2012) describes a method for identifying and classifying malicious web resources. The method is based on applying machine learning algorithms to recognize and classify malicious web resources based on various characteristics.

U.S. Pat. No. 8,856,937 (issued Oct. 7, 2014) describes a method and system for identifying malicious web resources. This known method includes creating an update for a database containing legitimate web resources, suspicious web resources, and malicious web resources. Web resources are classified by comparing screenshots of web resources with legitimate and phishing web resources contained in the database.

In practice, known methods to identify malicious web resources automatically may incorrectly classify a web resource, for example, a legitimate web resource or a web resource associated with a legitimate website will be classified as malicious. And, vice versa, some malicious web resources may not be identified as malicious or suspicious, but may be classified as legitimate, as a result of which all similar malicious web resources will also be classified as legitimate, for example, those created by the same phishing pack may also be classified as legitimate, non-malicious web resources. To prevent such situations from arising, an expert must manually verify the web resources. Manually verifying many web resources is laborious and can lead to erroneous results due to the human factor.

SUMMARY

The non-limiting embodiments of the present technoogy are directed a method and a system that identify malicious web resources. The non-limiting embodiments of the present technology aim to reduce human involvement in the process of identifying malicious web resources, in particular, phishing web pages, and to save them in a database for further analysis.

The speed and accuracy of identifying malicious web resources are important characteristics, which many known technical solutions are aimed at improving. However, as noted above, the known technical solutions possess shortcomings and need to be improved.

The technical result of the non-limiting embodiments of the present technology is the elimination of at least some shortcomings inherent in the known state of the art solutions.

In accordance with a first broad aspect of the present technology, there is provided a method for identifying malicious web resources, the method executable on a computer device. The method comprises: receiving, by the computer device, pointers for a plurality of web resources; extracting, by the computer device, at least some of the content elements of each web resource of the plurality of web resources; combining, by the computer device, at least two content elements into at least one first subgroup in response to a number of web resources including said at least two content elements exceeding a predefined minimum threshold of web resources for the at least one first subgroup; combining, by the computer device, at least two content elements into at least one second subgroup in response to number of web resources including said at least two content elements exceeds a predefined minimum threshold of web resources for the at least one second subgroup; combining, by the computer device, the at least one first subgroup and the at least one second subgroup into a group of content elements in response to the number of web resources including the content elements of the at least one first subgroup and the at least one second subgroup exceeding a predefined threshold of web resources for the group; storing, by the computer device in a database, the content element group and the pointers for the web resources associated with the relevant content element group.

In some implementations of the method, the plurality of web resources comprises at least two web resources.

In some implementations of the method, the method further comprises: performing a preliminary network scan to obtain pointers for the plurality of web resources.

In some implementations of the method, the receiving the pointers for the plurality of web resources comprises obtaining at least a portion of the pointers from an external source via a data network.

In some implementations of the method, the receiving the pointers for the plurality of web resources comprises obtaining the pointers from a previously composed database of web resources.

In some implementations of the method, the receiving the pointers for the plurality of web resources comprises obtaining at least some pointers from a list of previously extracted pointers for content elements of the plurality of web resources.

In some implementations of the method, the content elements are one of: (i) files of content elements and (ii) hash sums of files of content elements.

In some implementations of the method, the method further comprises, after extracting at least some of the content elements, performing a filtering, the filtering including deleting previously defined standard content elements, and wherein combining is executed without the deleted content elements.

In some implementations of the method, the method further comprises, prior to saving the group of content elements, determining a weight for a group, the determining being based on a ratio of a number of content elements in the group and a number of web resources associated with the group of content elements, and wherein the first and second subgroups of content elements are combined into the group in response to the weight of the obtained group exceeding the predefined threshold.

In some implementations of the method, the method further comprises, after saving the group of content elements and pointers for web resources associated with said group of content elements, identifying malicious web resources associated with the group of content elements.

In some implementations of the method, the identifying of malicious web resources comprises receiving an indication thereof from a human assessor.

In accordance with another broad aspect of the present technology, there is provided a computer device for identifying malicious web resources, the computer device communicatively coupled to a data network and at least one database, the computer device comprising a computer processor. The computer processor is configured to: receive pointers for a plurality of web resources; extract at least some of the content elements of each web resource of the plurality of web resources; combine at least two content elements into at least one first subgroup in response to a number of web resources including said at least two content elements exceeding a predefined minimum threshold of web resources for the at least one first subgroup; combine at least two content elements into at least one second subgroup in response to number of web resources including said at least two content elements exceeds a predefined minimum threshold of web resources for the at least one second subgroup; combine the at least one first subgroup and the at least one second subgroup into a group of content elements in response to the number of web resources including the content elements of the at least one first subgroup and the at least one second subgroup exceeding a predefined threshold of web resources for the group; store in the at least one database, the content element group and the pointers for the web resources associated with the relevant content element group.

In some implementations of the device, the processor is further configured to perform a network scan to obtain the pointers for a plurality of web resources.

In some implementations of the device, the processor is further configured to obtain pointers for the plurality of web resources at least partially from an external source via a data network.

In some implementations of the device, the processor is further configured to obtain pointers for the plurality of web resources from a previously composed database of web resources.

In some implementations of the device, to receive the pointers for the plurality of web resources, the processor is configured to obtain at least some of the pointers from previously extracted pointers for content elements of the plurality of web resources.

In some implementations of the device, the content elements are files of content elements or hash sums of files of content elements.

In some implementations of the device, after extracting at least some of the content elements, the processor is further configured to perform a filtration by deleting previously defined standard content elements, and to combine at least two elements into a group without the deleted content elements.

In accordance with another broad aspect of the present technology, there is provided a method for identifying malicious web resources, the method executable on a computer device. The method comprises: receiving, by the computer device, pointers for a plurality of web resources;

extracting, by the computer device, at least some of the content elements of each web resource of the plurality of web resources; iteratively combining, by the computer device, a given combination of at least two content elements into at least one subgroup in response to a number of web resources including the given combination exceeding a predefined minimum threshold of web resources for the at least one first subgroup; iteratively combining, by the computer device, the at least one subgroup into a group of content elements in response to the number of web resources including the content elements of the at least one subgroup exceeding a predefined threshold of web resources for the group; storing, by the computer device in a database, the content element group and the pointers for the web resources associated with the relevant content element group; using, by the computer device, a machine learning algorithm to analyze the content element group to flag malicious web resources.

In the context of this description, "computer device" means a computer program operating on relevant hardware, which is able to receive requests (for example, from client devices) via a network and to execute these requests or initiate the execution of these requests. The hardware may consist of one physical computer or one physical computer system. In the context of the non-limiting embodiments of the present technology, the use of the expression "computer device" does not mean that each request (for example, received commands or requests) or any particular request will be received, executed, or have its execution initiated by the same "computer device" (that is, the same software and/or hardware); this means that any number of elements of software or hardware may be involved in receiving/transmitting, executing or initiating the execution of any request or consequence of any request related to the client device, and all this software and hardware may consist of a single computer device or several computer devices, both options are included in the expression "at least one computer device."

In the context of this description, "database" means any structured plurality of data, regardless of the specific structure, the software used to manage the database, the computer hardware on which the data is stored, used, or otherwise made accessible for use. The database may be located on the same hardware that runs the process that stores or uses the information stored in the database, or it may be located on separate hardware, for example, a dedicated server or plurality of servers.

In the context of this description "component" means software (corresponding to specific hardware context) that is necessary and sufficient to perform the specific specified function(s).

In the context of this description, unless expressly indicated otherwise, the term "content element" or "content" means any data that may be presented (visually, in audio format, or otherwise), that a web resource may contain. Thus, for purposes of this solution a content element may be, in particular, a script, font, menu element, web resource template, fillable form, written text, an image, part of an image, a graph, animation, video, music, voice recording, etc., as well as any combination of these. Furthermore, the definition also encompasses any other resources that may be transferred via http/https protocols.

In the context of this description, unless expressly indicated otherwise, the "locator" or "pointer" of an information element may be the information element itself or a locator, reference, link, or other indirect method that allows the recipient of the pointer to find the network, memory, database, or other machine-readable medium from which the information element may be extracted. For example, a web resource locator may include a file itself, or a plurality of web resource files, or it may even be a uniform resource locator (for example, URL www.webpage.com) that identifies the web resource in relation to a specific network (in particular, the Internet), or some other means to transfer the pointer to the recipient for a network folder, memory address, table in a database, or other place in which the web resource or its individual content elements can be accessed. As will be understood by those skilled in the art, the degree of specificity required for such an pointer depends on the degree of originally understanding how the information exchanged by the sender and receiver of the locator should be interpreted. For example, if it is understood prior to transmitting data between the sender and recipient that the information element locator takes the form of a Universal Resource Locator (URL), transmitting the locator and link to this web resource is all that is necessary to effectively transmit the web resource to the recipient, despite the fact that the information element itself (for example, the web resource or a specific content element of it) was not transmitted between the sender and recipient of the pointer.

In the context of this description, unless expressly indicated otherwise, the words "first," "second," third," etc. are used are used as adjectives solely in order to distinguish the nouns they modify from one another, and not for purposes of describing any specific relation between these nouns. So, for example, it should be borne in mind that the use of the terms "first web resource" and "third web resource" do not imply any sort of order, assignment to a specific category, chronology, hierarchy, or ranking (for example) of web resources within the plurality of web resources, similarly their use (by itself) does not imply that a certain "second web resource" must exist in any given situation. Furthermore, as specified here in other contexts, mentioning a "first" element and a "second" element does not rule out the fact that they could actually be the same element. Therefore, for example, in some cases, the "first" server and the "second" server may be the same software and/or hardware, and in other cases, they may be different software and/or hardware.

In the context of this description "machine-readable medium" means a medium of absolutely any type and nature, including RAM, ROM, disks (CDs, DVDs, floppy disks, hard disks, etc.), USB flash drives, solid state drives, tape drives, etc.

Additional and/or alternative features, aspects, and advantages of different embodiments of this technology will be apparent from the following description, drawings, and claims.

BRIEF DESCRIPTION OF THE DRAWINGS

In order to better understand the non-limiting embodiments of the present technology, as well as its other aspects and characteristic features, reference is made to the following description, which should be used in conjunction with the accompanying drawings, where.

DETAILED DESCRIPTION OF THE NON-LIMITING EMBODIMENTS OF THE TECHNOLOGY

The following description serves only a description of an illustrative example of the non-limiting embodiments of the present technology. This description is not intended to define the scope or impose limitations on the non-limiting embodiments of the present technology.

Some useful examples of modifications to the described method and system for identifying malicious web resources may also be covered by the following description. The goal of this is also exclusively to assist in understanding, and not to define the scope or limitations to the non-limiting embodiments of the present technology. These modifications do not constitute an exhaustive list, and persons skilled in the art will recognize that other modifications are possible. Furthermore, it should not be interpreted in such a way that no modifications are possible where no examples of modifications have been stated, and/or that something described is the only option for implementing a certain element of the non-limiting embodiments of the present technology. As will be clear to a person skilled in the art, this is most likely not the case. Furthermore, it should be borne in mind that, for several specific manifestations, the method and system for identifying malicious web resources consist of simple different embodiments of the non-limiting embodiments of the present technology, which in such cases are presented here in order to facilitate understanding. As a person skilled in the art will understand, many different embodiments of the non-limiting embodiments of the present technology will possess much greater complexity.

Figure 1:
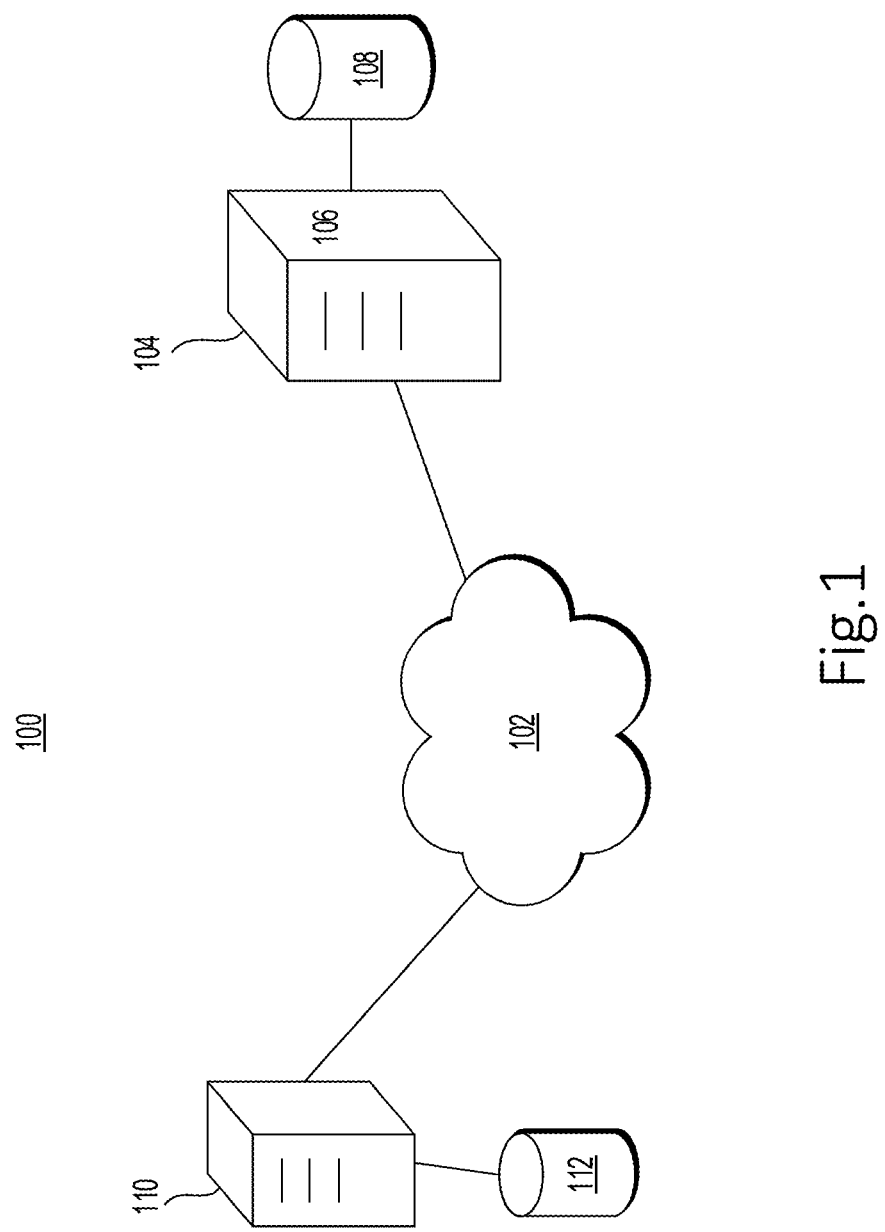
FIG. 1 depicts a system suitable for implementing non-limiting embodiments of the non-limiting embodiments of the present technology.

FIG. 1 is a simplified schematic representation of one of the non-limiting embodiments of system 100 to implement the non-limiting embodiments of the present technology.

In some non-limiting embodiments of the present technology, system 100, which implements the method, comprises a data transmission network 102, at least one computer device 104 to identify malicious web resources (hereinafter computer device 104), processor 106 included in the computer device 104, and a database 108. The system 100 may also include at least one search engine 110, which has access to a web resource database 112.

In another non-limiting embodiment of the present technology, the system 100 may include additional active network equipment (not shown) and a client device (not shown).

Data transmission network 102 may be, for example, the Internet or any other computer network.

Computer device 104 may be an ordinary computer server. In the example embodiment of this technology, the computer device 104 may be a Dell™ PowerEdge™ server, which uses the Ubuntu Server 18.04 operating system. The computer device 104 may be any other suitable hardware and/or application software and/or system software, or a combination thereof. In this non-limiting embodiment of this technology, the computer device 104 is a single server. In other non-limiting embodiments of this technology, the functionality of the computer device may be divided among several computer devices, and, for example, may be provided by several servers.

Embodiments of the computer device 104 are well known. Thus, it is sufficient to note that computer device 104 includes, among other things, a data transmission network interface (for example, a modem, network map, etc.) for two-way communication over the data transfer network 102; and processor 106, connected to the data transmission network interface, where the processor 106 is configured to perform various procedures, including those described below. The processor 106 can have access to machine-readable instructions stored on machine-readable medium (not shown), the execution of which initiates the processor 106 executing various procedures described herein.

In some embodiments of this technology, the computer device 104 includes one or several databases 108, which are configured to store at least some of the content element pointers, content elements, groups of content elements, and pointers to web resources associated with the relevant content element or group of content elements. In the context of this description, associated means linked or contained. For example, a web resource that has all the content elements from a group of content elements is associated with that group of content elements.

Although the database 108 is represented as separate from the computer device 104, to which it is connected using a corresponding line (not numbered), the database 108 may be implemented as part of the computer device 104 or be accessible by the computer device 104 by other means.

In another non-limiting embodiments of the system 100, the computer device 104 includes machine-readable medium (not shown), on which machine-readable instructions and/or database 108 may be stored in advance. Alternatively or additionally, the computer device 104 may have access to machine-readable instructions and/or the database 108 located on other hardware.

The processor 106 is configured to receive pointers for a plurality of web resources. As a non-limiting example, receiving pointers for a plurality of web resources may include receiving a list of uniform resource locators (URLs). The source or sources of pointers for the plurality of web resources is not particularly limited.

In another possible embodiment of this technology, the processor 106 is configured to obtain pointers for the plurality of web resources at least partially from an external source via data transmission network 102. For example, the external source could be the search engine 110, which has access to the web resource database 112 and/or a server that collects data on malicious web resources (not shown), etc. Moreover, the computer device 104 may have access to the web resource database 112 via the data transmission network 102. Alternatively or additionally, an external source may be a web resource, that stores pointers for the plurality of web resources.

Thus, exactly how and by what principle pointers for web resources are grouped on an external source, in particular, on the web resource database 112, is not particularly limited.

In an example embodiment of this technology, the search engine 110 may be a Dell™ PowerEdge™ server, which uses the Ubuntu Server operating system. Search engine 110 also may be implemented in any other suitable hardware and/or application software and/or system software, or a combination thereof. In the illustrated non-limiting embodiment of this technology, the search engine 110 is a single server. In other non-limiting embodiments of this technology, the functionality of the search engine 110 may be distributed, and may be provided by several servers.

Embodiments of the search engine 110 are well known. Thus, it is sufficient to note that search engine 110 includes, among other things, a data transmission network interface (for example, a modem, network card, etc.) for two-way communication over the data transmission network 102; and a processor (not shown), connected to the data transmission network interface, the processor being configured to search web resources on data transmission network 102 and store them in the web resource database 112. With this goal, the search engine processor can have access to relevant machine-readable instructions stored on a machine-readable medium (not shown).

The process of data updating and saving in the web resource database 112 is generally known as "data crawling". The search engine 110 is configured to "visit" various web resources, websites, and web pages that are accessible via the data transmission network 102, and save them in the web resource database 112 based on one or more predefined parameters. As a non-limiting example, the search engine 110 can scan the data transmission network 102 and save all new and updated web resources, thereby assembling a web resource database for the data transmission network 102, and/or collect web resources, for example, those including certain keywords in one or more languages. Since malicious web resources (in particular phishing websites) typically attempt to imitate bank websites, payment systems, and email services, some example keywords may be, without being so-limited: "bank", "loan", "credit card", "mail", "account", "user name", "login", etc. The search can also be performed by domain names, and/or other parameters. So-identified and selected web resource pointers are saved in the web resource database 112, after which they can be obtained by the processor of the computer device 104 via the data transmission network 102 from the search engine 110.

In another non-limiting embodiment of this technology, in which the processor 106 of computer device 104 is configured to obtain pointers for the plurality of web resources directly from a previously generated web resource database 112. In this embodiment, the previously generated web resource database 112 may be implemented as part of the computer device 104 or be accessible to the computer device 104 by other means.

In another non-limiting embodiment of this technology, the processor 106 is configured to scan the data transmission network 102 in order to obtain pointers for the plurality of web resources and, in this way, the computer device 104 can perform the functionality of the search engine 110 described above. For example, the scan of the data transmission network 102 may be performed by web resource IP addresses, domain names, keywords, and other parameters.

The processor 106 of the computer device 104 can be configured to extract at least part of the content elements of each web resource from the plurality of web resources. Web resource content elements may be files of content element and/or hash sums of files of content elements (calculated, for example, with sha256 algorithm). The format of content element files is not specifically limited and depending on the specific type of content element. For example, in the case when a given content element is an image, the file may be in one of the following formats: "jpg", "jpeg", "png", "bmp", "gif", etc. In the case when the content element is text, the file may be in one of the following formats: "txt", "doc", "html", etc. In the case when the content element is a font, the file may be in one of the following formats: "woff", "ttf", "eot", "svg", etc. In the case when the content element is a script, the file may be in one of the following formats: "asp", "aspx", "php", "jsp", "cgi", etc. In the case when the content element is animation or video, the file may be in one of the following formats: "fly", "swf", "avi", "mp4", "mov", etc. In the case when the content element is a cascading style sheet, the file may be in the format: "css".

The extraction of web resource content elements can be performed by the processor 106. Extraction methods are well known, for example, a virtual browser such as Selenium may be used. The "cache all" option is set in the virtual browser, the cash is cleared, there is a transition to the web resource, after which the web resource's content elements are automatically saved in the browser's cache. Thus, content elements may be extracted from the plurality of web resources.

In another non-limiting embodiment of this technoogy, when the pointers for the plurality of web resources are obtained, the processor 106 is configured to obtain at least part of previously extracted pointers for content elements of the plurality of web resources.

In another non-limiting embodiment of this technoogy, the processor 106 is configured to perform filtration by deleting predefined standard content elements. During further processing, these filtered standard content elements are not taken into consideration. For example, cookies, common scripts, fonts, images, etc. may be predefined as standard content elements. The filtration criteria may be predefined by an expert or automatically, based on statistical data on the use of content elements in a plurality of web resources. For example, when the predefined threshold for the quantity of web resources associated with a given content element is exceeded, it can be considered a standard content item. The threshold can be set manually by the operator, or using various automated algorithms, including algorithms based on machine learning.

The processor 106 is configured to combine at least two content elements into at least one first subgroup in response to the number of web resources that include the content elements exceeding a predefined minimum threshold of web resources for that subgroup.

The processor 106 is configured to combine at least two content elements into at least one second subgroup in response to the number of web resources that include the content elements exceeding a predefined minimum threshold of web resources for that subgroup.

The processor 106 is configured to combine the first and second subgroups into a group of content elements in response to the number of web resources that include the content elements of the first and second subgroups exceeds a predefined threshold of web resources for that subgroup. The process of combining content elements into subgroups and groups will be described in more detail below as part of the description of the method.

The processor 106 is also configured to save each group of content elements and pointers for web resources associated with the corresponding group of content elements in database 108.

Figure 2:
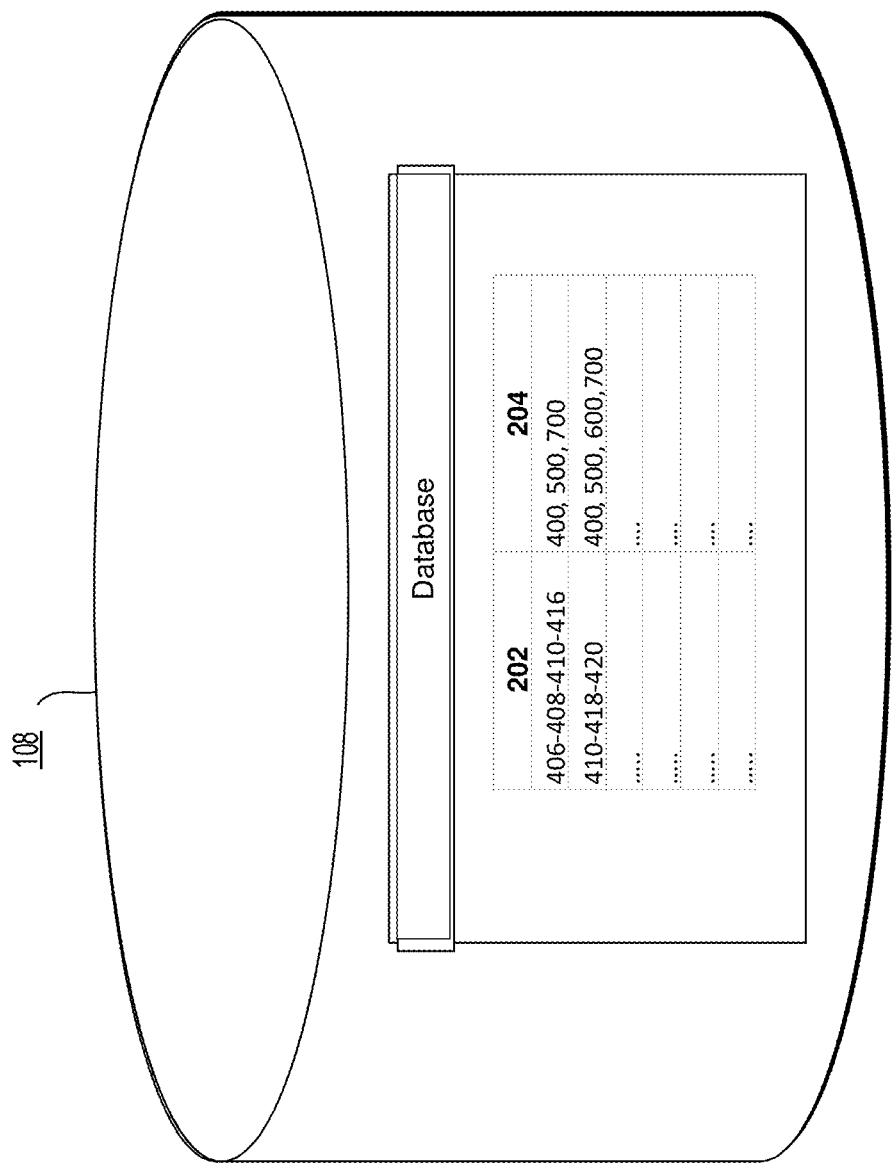
FIG. 2 shows one of the non-limiting implementations of displaying information about the resources of web pages in the resource database.

FIG. 2 is an illustrative example of the database 108, containing data representative of groups of content elements 202 and web resources 204 associated with the relevant group of content elements. In the illustrative example of FIG. 2, the database 108, only two groups of content elements are shown. One of the illustrated examples includes three content elements 410, 416, 418 associated with four web resources 400, 500, 600, and 700, and the second includes four content elements 406, 408, 418, 420 associated with three web resources 400, 500, and 700. Web resource examples 400, 500, 600, and 700 are shown in FIG. 4, FIG. 5, FIG. 6, and FIG. 7 respectively. It is worth noting that the number of content elements used for populating the database 108 is not specifically limited, the purpose of these examples of groups of content elements 202 and web resources 204 is only for facilitating understanding the non-limiting embodiments of the present technology. It is obvious that populating database 108 may entail much greater complexity. The number of groups of content elements 202 may be more than two, each group may contain at least three content elements, and different numbers of web resources 204 may be associated with each group of content elements 202. It should be noted that the same web resource may be simultaneously associated with one or several groups of content elements 202.

In another non-limiting embodiments of the present technology, the processor 106 is configured to identify malicious web resources associated with the group of content elements in the database 108. For example, the identification of malicious web resources may be carried out by a machine-learning algorithm that has previously been trained for selecting malicious web resources. In another non-limiting embodiment of the present technology, the identification of malicious web resources is performed at least partially by a human assessor. The human assessor may, via a separate client device (not shown), have access to the database 108 and verify web resources 204 associated with the groups of content elements 202.

Examples of client devices (among others) may be personal computers (desktops, laptops, netbooks, etc.), smartphones, tablets, as well as network equipment such as routers, switches, and gateways. It should be borne in mind that a device that behaves like a client device in this context may behave like a server in relation to other client devices. Use of the expression "client device" does not exclude the possibility of using a plurality of client devices to receive/send, execute, or initiate the execution of any task or request, nor the consequences of any task or request, nor the steps of any of the above-listed methods. A client device's communication with a user (human expert) does not imply any particular mode of operation, nor the need to login into a system, register, or anything similar. Accessing and exchanging data with database 108 and/or computer device 104 may be done by a client device (not shown), for example, via data transmission network 102 or another network (not shown).

Figure 3:
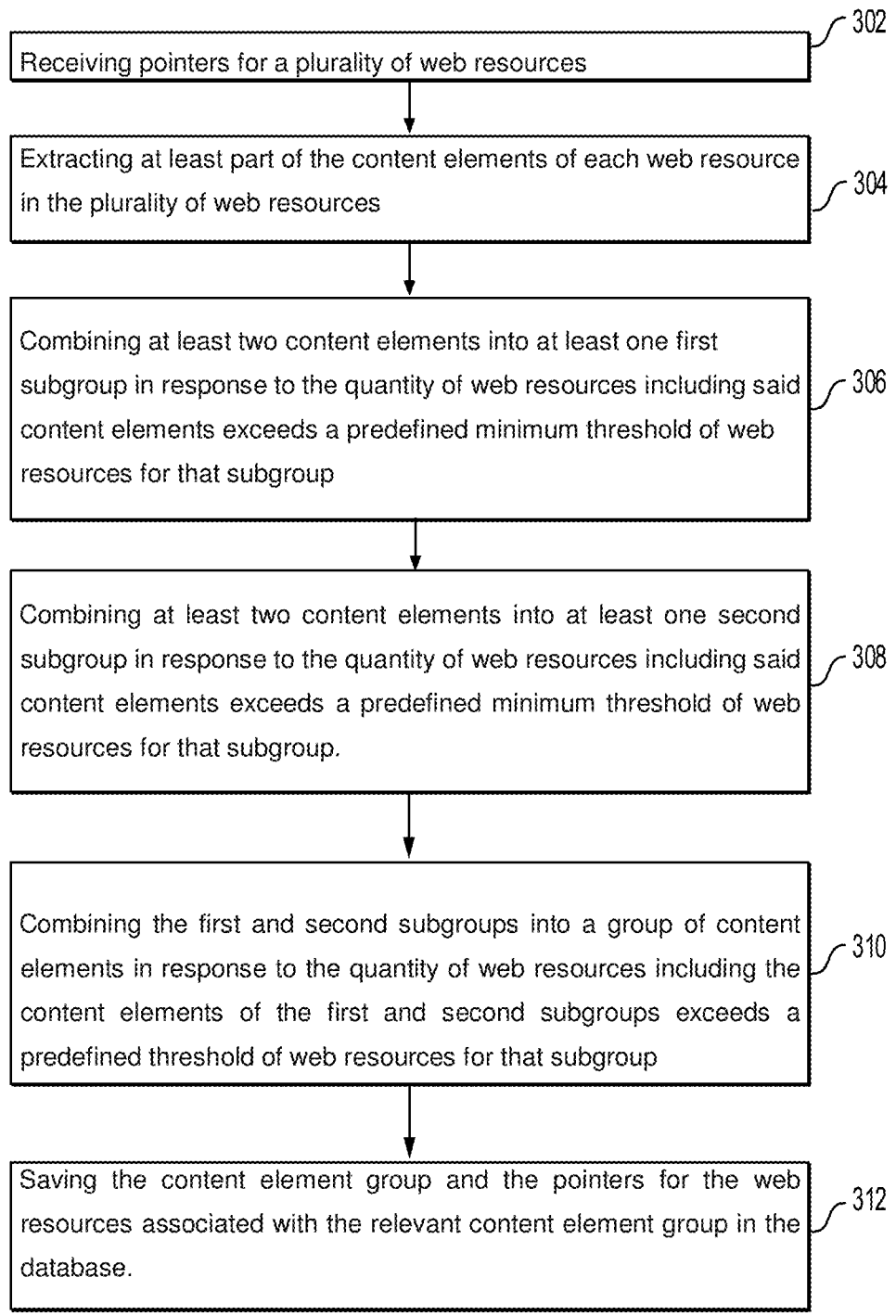
FIG. 3 is a flowchart that illustrates the aspect of this method for identifying malicious web resources.

Next, referring to FIG. 3, there is depicted a flow chart of a method 300 for identifying malicious web resources implemented in accordance with at least some non-limiting embodiments of the present technology. The method 300 may be performed on the computer device 104 and, specifically, by the processor 106 of the computer device 104 as depicted in the non-limiting embodiment of the system 100 in FIG. 1.

Referring to FIG. 4, FIG. 5, FIG. 6, and FIG. 7, an illustrative example of implementing the method 300 will now be described.

Figure 4:
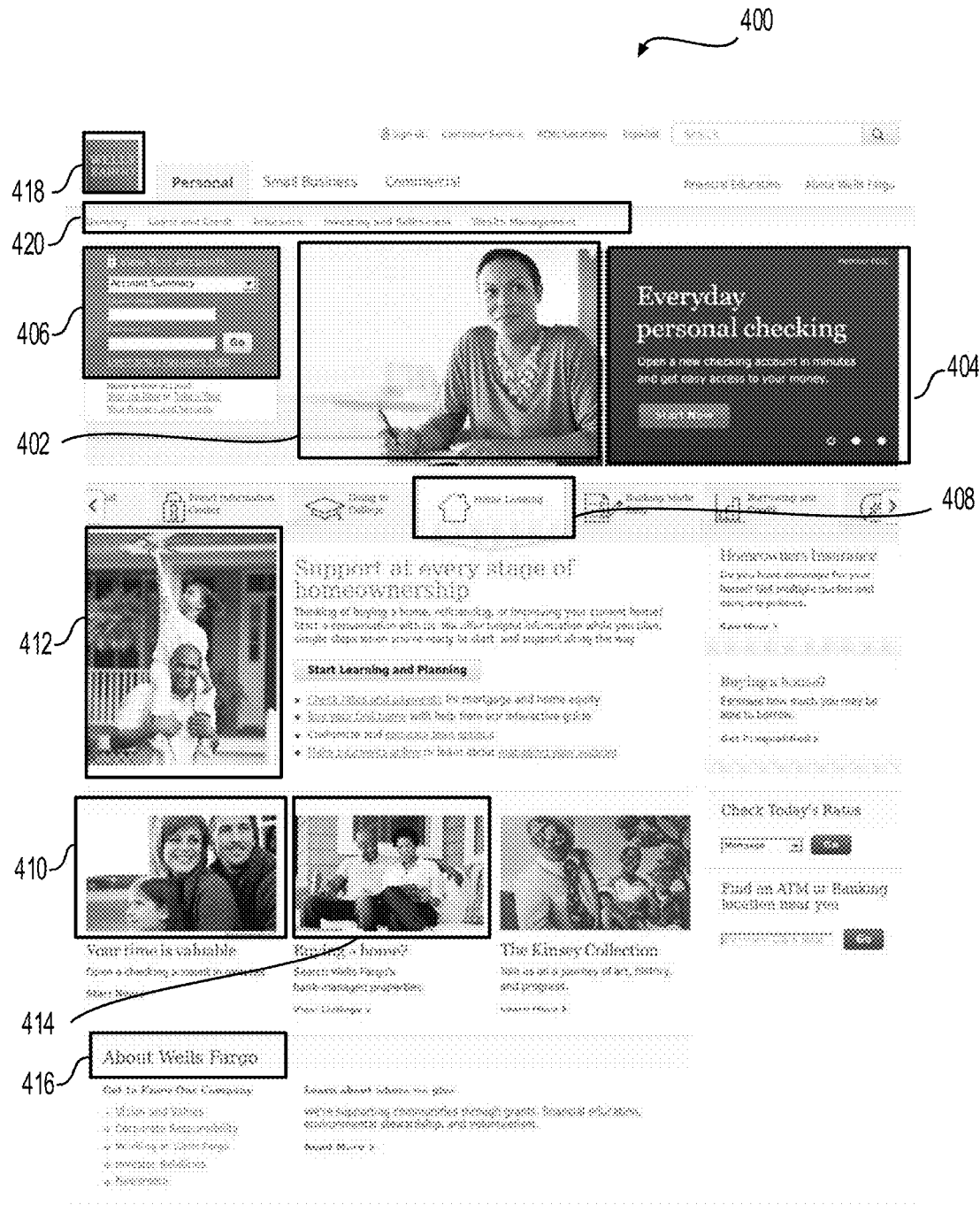
FIG. 4 is a non-limiting example of a first web resource.

FIG. 4 depicts an example of a first web resource 400, which includes content elements, in particular 402, 404, 406, 408, 410, 412, 414, 418, and 420. It should be noted that the content elements 402, 410, 412, 414, and 418 are images, the content element 404 is a banner with text, the content element 406 is a user authorization form that includes several fillable fields, text, and a button, the content element 408 is a menu element that includes an icon and text, the content element 416 is text, and the content element 420 is a web page menu script.

Figure 5:
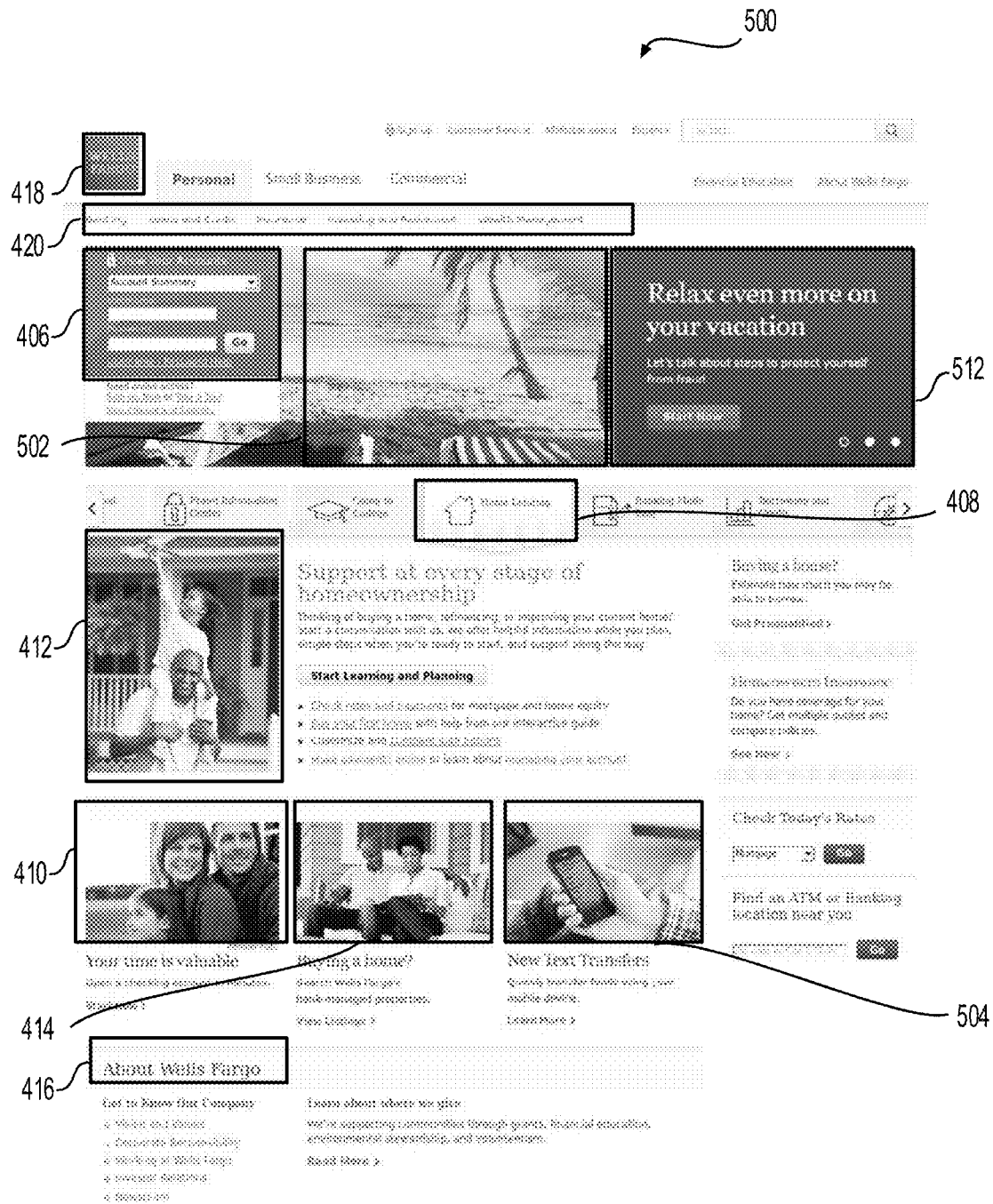
FIG. 5 is a non-limiting example of a second web resource.

FIG. 5 depicts an example of a second web resource 500, which includes content elements, in particular, 502, 504, 406, 408, 410, 412, 414, 416, 418, 420, and 512. Content elements 406, 408, 410, 412, 414, 416, 418, and 420 are also in the first web resource 400 and are described above. Content elements 502, 504 are images, content element 512 is a banner with text.

Figure 6:
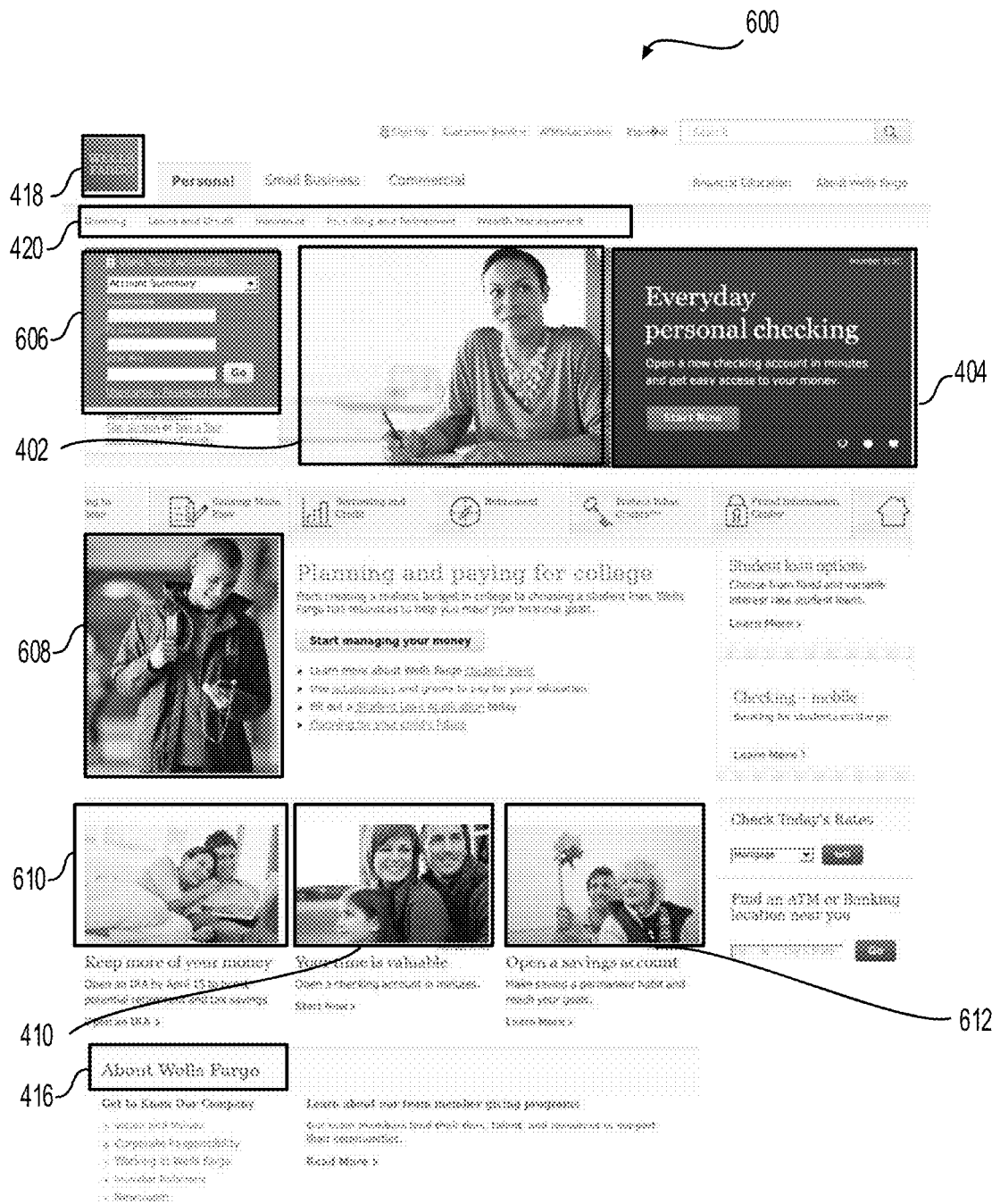
FIG. 6 is a non-limiting example of a third web resource.

FIG. 6 depicts an example of a third web resource 600, which includes content elements, in particular, 402, 404, 410, 416, 418, 420, 602, 606, 608, 610, and 612. Content elements 402, 404, 410, 416, 418, and 420 are also in the first web resource 400 and are described above. Content element 606 is a user authorization form that includes several fillable fields, text, and a button, content elements 608, 610, and 612 are images.

Figure 7:
FIG. 7 is a non-limiting example of a fourth web resource.

FIG. 7 depicts an example of a fourth web resource 700, which includes content elements, in particular, 702, 704, 406, 408, 410, 412, 414, 416, 418, 420, and 504. Content elements 406, 408, 410, 412, 414, 416, 418, and 420 are also in the first web resource 400 and are described above. Content element 504 is also in the second web resource 500 and is described above. Content element 702 is an image, content element 704 is a banner with text.

In the context of the non-limiting embodiments of the present technology, the number and types of different content elements are not limiting conditions. The web resources depicted in FIG. 4, FIG. 5, FIG. 6, and FIG. 7 are given only as illustrative examples; it is obvious that the non-limiting embodiments of the present technology may also be applied to any other web resources that possess a higher or lower quantity of content elements, where the types of content elements and even the content itself may be repeated or not repeated within the same web resource. Some of the content elements are not numbered in the illustrative web resource examples given.

The predefined minimum threshold for the number of web resources associated with a subgroup of content element is the minimum threshold of web resources for that subgroup. For this illustrative example, the minimum threshold of web resources for that subgroup is equal to 2. Furthermore, the predefined minimum threshold for the number of web resources associated with a group of content element is the minimum threshold of web resources for that group. For this illustrative example, let us assume that this minimum threshold of web resources for that group is also equal to 2. In another non-limiting embodiment of the present technology, the minimum threshold of web resources for that group is less than or equal to the minimum threshold of web resources for that subgroup. For example, the minimum threshold of web resources for that subgroup can equal to 150, but the minimum threshold of web resources for that group can be equal to 10.

In another non-limiting embodiment of the method 300, there is a predefined maximum threshold for the number of web resources associated with a content element. For example, the threshold may be equal to 450, or to any other number.

In another non-limiting embodiment of the method 300, there are predefined threshold group weights, the group weights being determined by the ratio of the number of content elements in the group and the number of web resources associated with a given group of content elements. For example they may be defined by a function Score (L,q), where L is the number of content elements in the group, and q is the number of web resources associated with the group. The function defining the weight of a group may be defined by an expert (operator) and/or defined by a machine-learning algorithm.

Here is an example of the function Score (L,q) to define the group weights of content elements:

```
def score(L, q):
    if L <= 1:
        return 0.0
    if L >=10:
        koef=2.0
    else:
        koef = {
            2: 0.5,
            3: 0.8,
            4: 1.0,
            5: 1.15,
            6: 1.3,
            7: 1.5,
            8: 1.7,
            9: 1.9,
        }[L]
    return q*koef
```

Stage 302—Receiving Pointers for a Plurality of Web Resources

Method 300 begins at step 302, where computer device 104 receives pointers for a plurality of web resources. Pointers for the plurality of web resources may be web resources themselves or links to web resources, URLs that are accessible via the data transmission network 102 or another network (not shown) to computer device 104. In this regard, the plurality of web resources contains at least two web resources.

In the non-limiting illustrative example, during step 302, the computer device 104 receives pointers for the plurality of four web resources 400, 500, 600, and 700 from an external source, such as from web resource database 112 of the search engine 110. Web resources 400, 500, 600, and 700 were previously located by the search engine 110 and saved in the web resource database 112. Pointers for the plurality of web resources may be received at least partially from a previously populated web resource database 112. In alternative non-limiting embodiment of the method 300, the computer device 104 receives pointers for the plurality of web resource directly from the web resource database 112.

In another possible embodiment of the method, computer device 104 performs a scan of the data transmission network 102 in order to obtain the pointers for the plurality of web resources. The scan of the data transmission network 102 may be performed by the computer device 104 in the same way as for search engine 110 as described above, or in any other way.

In another non-limiting embodiment of the method 300, during step 302, the plurality of web resources is received from at least two different sources. For example, web resources 400 and 600 are obtained via the search engine 110 from web resource database 112, but web resources 500 and 700 are obtained from another external source (not shown) via data transmission network 102.

Method 300 then continues to performing step 304.

Stage 304—Extracting at Least Part of the Content Elements of Each Web Resource in the Plurality of Web Resources During step 304, the processor 106 of the computer device 104 extracts at least part of the content elements from the plurality of web resources that were obtained during step 302. According to the non-limiting illustrative example, content elements 402, 404, 406, 408, 410, 412, 414, 418, and 420 are extracted from the first web resource 400, content elements 502, 504, 406, 408, 410, 412, 414, 416, 418, 420, and 512 are extracted from the second web resource 500, content elements 402, 404, 410, 416, 418, 420, 602, 606, 608, 610, and 612 are extracted from the third web resource 600, and content elements 702, 704, 406, 408, 410, 412, 414, 416, 418, 420, and 504 are extracted from the fourth web resource 700.

In another non-limiting embodiment of the method 300, part of the content elements, or pointers for some of the content elements, are obtained during step 302 along with the plurality of web resources. For example, web resources and at least part of content elements extracted from the relevant web resources are stored in advance in web resource database 112.

In another non-limiting embodiment of the method 300, files of content elements or hash sums of files of content elements are extracted as content elements.

Method 300 then continues to performing step 306.

Stage 306—Combining at Least Two Content Elements into at Least One First Subgroup in Response to the Quantity of Web Resources that Include Said Content Elements Exceeds a Predefined Minimum Threshold of Web Resources for that Subgroup;

During step 306, the processor 106 of the computer device 104 creates all possible combinations of at least two different content elements. For each created combination, the processor 106 checks for the presence of a predefined minimum number of web resources that include this combination of content elements. When the number of web resources that include the combination of at least two content elements exceeds the predefined minimum threshold, the processor 106 combines at least two content elements into at least one first subgroup of content elements.

In this illustrative example, the processor 106 creates the following combinations of content elements that have been extracted from web resources 400, 500, 600, and 700:

. . .
402-406
402-410
. . .
406-408
. . .
502-402
. . .
410-416
410-418
. . .
420-418
. . .
504-410
. . .
608-702-404
. . .
702-420
. . .

In this simplified illustrative embodiment, many different combinations of web resource content elements are possible, and the combinations given above are only a small portion of all possible combinations.

In this illustrative embodiment of method 300, the predefined minimum threshold of web resources for that subgroup is equal to 2. This criterion is met by, for example, the following pairs of elements: 406-408; 420-418.

The processor 106 combines this pair of content elements into two first subgroups of content elements.

In another non-limiting embodiment of the method 300, after extracting at least part of the content elements, a filtration is performed by deleting previously defined standard content elements, and then at least two elements are combined into at least one subgroup without the deleted content elements.

In another non-limiting embodiment, there is a predefined maximum threshold for the quantity of web resources associated with a content element. For example, if this value is equal to 450 (or any other natural number n), then the content elements that belong to over 450 (over n) web resources are also excluded by the processor 106, and not taken into consideration when creating the combinations of content elements extracted from web resources.

Stage 308—Combining at Least Two Content Elements into at Least One Second Subgroup in Response to the Quantity of Web Resources that Include Said Content Elements Exceeds a Predefined Minimum Threshold;

During step 308, as in step 306 described above, the processor 106 of the computer device 104 combines at least two content elements into at least one second subgroup of content elements.

In the context of the non-limiting embodiments of the present technology, the concepts of "first" and "second" subgroups of content elements are introduced solely to facilitate understanding, and to explain that these are not the same subgroup of content elements. It is worth noting that some content elements may coincide between the first and second subgroup of content elements.

The second subgroup of content elements is generated by the processor 106 in a similar way based on all possible combinations of at least two different content elements, as described above.

In this illustrative embodiment of the method 300, the predefined minimum threshold of web resources is equal to 2. This criterion is also met by, for example, the following pairs of elements: 410-416; 410-418, which are present in more than two web resources. Processor 106 combines this pair of content elements into a second subgroup of content elements.

Processor 106 can create a plurality of subgroups of content elements as was shown in the description of steps 306 and 308 of method 300. The shown embodiment, which includes two first and two second subgroups of content elements, is not limiting. The quantity of possible subgroups of content elements combined by processor 106 may be in the tens, hundreds, thousands, etc., depending on the quantity of received web resources and the quantity of extracted and coinciding content elements.

Method 300 then transits to performing step 310.

Stage 310—Combining the First and Second Subgroups into a Group of Content Elements in Response to the Quantity of Web Resources that Include the Content Elements of the First and Second Subgroups Exceeds a Predefined Threshold of Web Resources for that Subgroup;

During step 310, the processor 106 of the computer device 104 creates all possible combinations of at least two different subgroups of content elements obtained during steps 306 and 308. For each created combination, the processor 106 checks for the presence of a predefined minimum number of web resources that include this combination of content elements. When the number of web resources that include the content elements of the first and second subgroups exceeds a predefined minimum threshold of web resources for that group, the processor 106 combines at least one first subgroup of content elements and at least one second subgroup of content element into at least one group of content elements.

In this illustrative embodiment of the method 300, there are only two first subgroups of content elements 406-408, 420-418 and two second subgroups of content elements 410-416; 410-418. The first subgroup of content elements 406-408 may be combined, for example, with the second subgroup of content elements 410-416 into a group of content elements, because all four content elements are in the first 400, second 500, and fourth 700 web resources, which exceeds the predefined threshold of web resources for that group of 2. Consequently, the first created group of content elements includes four content elements 406-408-410-416 associated with three web resources 400, 500, and 700.

Another first subgroup of content elements 420-418 may be combined, for example, with another second subgroup of content elements 410-418 into a group of content elements, because all these content elements are in the first 400, second 500, third 600, and fourth 700 web resources, which exceeds the predefined threshold of web resources for that group of 2. Consequently, the created second group of content elements includes three content elements 408-410-416 associated with four web resources 400, 500, 600, and 700.

The number of possible subgroups of content elements combined by the processor 106 may be in the tens, hundreds, thousands, etc., depending on the number of received web resources and the quantity of extracted and coinciding content elements. The number of groups may be equal to one or more, despite the fact that two groups are content elements are shown in this illustrative example.

In another non-limiting embodiment, prior to saving the group of content elements, the weight is determined for each group based on the ratio of the quantity of content elements in the group and the number of web resources associated with that group of content elements, the first and second subgroup of content elements are combined into a group in response the weight of the obtained group exceeds the predefined threshold.

In this illustrative example, the weight of the second group of content elements is equal to 3.2, and the weight of the first group of content elements is equal to 3. Taking into consideration the example of the Score (L,q) function given above, it exceeds the weight of the fight group of content elements because it is smaller. In another non-limiting embodiment of this method, the threshold weight of a group is equal to 3; in this case, during step 310, according to this illustrative example only the second group of content elements will be formed or created.

Method 300 then continues to performing step 312.

Stage 312—Saving the Content Elements Group and the Pointers for the Web Resources Associated with the Relevant Content Element Group in the Database.

During step 312, the processor 106 of the computer device 104 stores the group or groups of content elements created during the step 310 in the database 108. The processor 106 also saves pointers for web resources associated with the relevant group or groups of content elements. In this case, web resources that include all content elements of the group of content elements are considered to be associated with the group of content elements.

In this illustrative embodiment of the method 300, the processor 106 stores in database 108 the first group of content elements that includes content elements 406-408-410-416, with which three web resources 400, 500, and 700 are associated, and the second group of content elements that includes three content elements 410-418-420, with which four web resources 400, 500, 600, and 700 are associated.

Then, the execution of method 300 may be terminated.

In another non-limiting embodiment, after saving each group of content elements and pointers for web resources associated with the group of content elements in the database, pointers are obtained for at least one additional web resource; at least part of the content elements of each web resource is extracted; in response to an identification in the database of at least one group of content elements with which said at least one specified additional web resource is associated, the pointers for the additional web resource are saved in the database.

In another non-limiting embodiment of the method 300, after saving the group of content elements and pointers for web resources associated with said group of content elements, malicious web resources associated with the group of content elements are also identified. In another possible embodiment of the method in which the identification of malicious web resources is performed at least partially by a human expert.

The non-limiting embodiments of the method for identifying malicious web resources ensures the automatic clustering of pluralities of web resources into groups, which allows an expert to perform a check in real time on each of the saved groups, and to identify groups of phishing sites, for example, those created by phishing kits, and also to identify mirrors and copies of blocked and previously identified malicious web resources. In this way, the expert's workload is substantially reduced during the process of identifying malicious web resources.

Modifications and improvements to the above-described embodiments of this technology will be clear to persons skilled in the art. The preceding description was given only as an example and does not impose any limitations. Thus, the scope of this technology is limited only by the scope of the appended claims.

The invention claimed is:

1. A method for identifying malicious web resources, the method executable on a computer device, the method comprising:
   receiving, by the computer device, pointers for a plurality of web resources;
   extracting, by the computer device, at least some of the content elements of each web resource of the plurality of web resources;
   combining, by the computer device, at least two content elements into at least one first subgroup in response to a number of web resources including said at least two content elements exceeding a predefined minimum threshold of web resources for the at least one first subgroup;
   combining, by the computer device, at least two content elements into at least one second subgroup in response to number of web resources including said at least two content elements exceeds a predefined minimum threshold of web resources for the at least one second subgroup;
   combining, by the computer device, the at least one first subgroup and the at least one second subgroup into a group of content elements in response to the number of web resources including the content elements of the at least one first subgroup and the at least one second subgroup exceeding a predefined threshold of web resources for the group;
   storing, by the computer device in a database, the content element group and the pointers for the web resources associated with the relevant content element group.

2. The method of claim 1, wherein the plurality of web resources comprises at least two web resources.

3. The method of claim 1, wherein the method further comprises: performing a preliminary network scan to obtain pointers for the plurality of web resources.

4. The method of claim 1, wherein the receiving the pointers for the plurality of web resources comprises obtaining at least a portion of the pointers from an external source via a data network.

5. The method of claim 1, wherein the receiving the pointers for the plurality of web resources comprises obtaining the pointers from a previously composed database of web resources.

6. The method of claim 1, wherein the receiving the pointers for the plurality of web resources comprises obtaining at least some pointers from a list of previously extracted pointers for content elements of the plurality of web resources.

7. The method of claim 1, wherein the content elements are one of: (i) files of content elements and (ii) hash sums of files of content elements.

8. The method of claim 1, wherein the method further comprises, after extracting at least some of the content elements, performing a filtering, the filtering including deleting previously defined standard content elements, and wherein combining is executed without the deleted content elements.

9. The method of claim 1, wherein the method further comprises, prior to saving the group of content elements, determining a weight for a group, the determining being based on a ratio of a number of content elements in the group and a number of web resources associated with the group of content elements, and wherein the first and second subgroups of content elements are combined into the group in response to the weight of the obtained group exceeding the predefined threshold.

10. The method of claim 1, wherein the method further comprises, after saving the group of content elements and pointers for web resources associated with said group of content elements, identifying malicious web resources associated with the group of content elements.

11. The method of claim 1, wherein the identifying of malicious web resources comprises receiving an indication thereof from a human assessor.

12. A computer device for identifying malicious web resources, the computer device communicatively coupled to a data network and at least one database, the computer device comprising a computer processor, the computer processor being configured to:
   receive pointers for a plurality of web resources;
   extract at least some of the content elements of each web resource of the plurality of web resources;
   combine at least two content elements into at least one first subgroup in response to a number of web resources including said at least two content elements exceeding a predefined minimum threshold of web resources for the at least one first subgroup;
   combine at least two content elements into at least one second subgroup in response to number of web resources including said at least two content elements exceeds a predefined minimum threshold of web resources for the at least one second subgroup;
   combine the at least one first subgroup and the at least one second subgroup into a group of content elements in response to the number of web resources including the content elements of the at least one first subgroup and the at least one second subgroup exceeding a predefined threshold of web resources for the group;
   store in the at least one database, the content element group and the pointers for the web resources associated with the relevant content element group.

13. The device of claim 12, wherein the processor is further configured to perform a network scan to obtain the pointers for a plurality of web resources.

14. The device of claim 12, wherein the processor is further configured to obtain pointers for the plurality of web resources at least partially from an external source via a data network.

15. The device of claim 12, wherein the processor is further configured to obtain pointers for the plurality of web resources from a previously composed database of web resources.

16. The device of claim 12, wherein to receive the pointers for the plurality of web resources, the processor is configured to obtain at least some of the pointers from previously extracted pointers for content elements of the plurality of web resources.

17. The device of claim 12, wherein the content elements are files of content elements or hash sums of files of content elements.

18. The device of claim 12, wherein, after extracting at least some of the content elements, the processor is further configured to perform a filtration by deleting previously defined standard content elements, and to combine at least two elements into a group without the deleted content elements.

19. A method for identifying malicious web resources, the method executable on a computer device, the method comprising:
- receiving, by the computer device, pointers for a plurality of web resources;
- extracting, by the computer device, at least some of the content elements of each web resource of the plurality of web resources;
- iteratively combining, by the computer device, a given combination of at least two content elements into at least one subgroup in response to a number of web resources including the given combination exceeding a predefined minimum threshold of web resources for the at least one first subgroup;
- iteratively combining, by the computer device, the at least one subgroup into a group of content elements in response to the number of web resources including the content elements of the at least one subgroup exceeding a predefined threshold of web resources for the group;
- storing, by the computer device in a database, the content element group and the pointers for the web resources associated with the relevant content element group;
- using, by the computer device, a machine learning algorithm to analyze the content element group to flag malicious web resources.

* * * * *